(12) United States Patent
Torrini et al.

(10) Patent No.: US 7,949,131 B2
(45) Date of Patent: May 24, 2011

(54) DIGITAL SECURITY SYSTEM

(75) Inventors: Antonio Torrini, Austin, TX (US);
Konstantin Shkolnyy, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1523 days.

(21) Appl. No.: 11/312,672

(22) Filed: Dec. 19, 2005

(65) Prior Publication Data

US 2007/0142943 A1    Jun. 21, 2007

(51) Int. Cl.
H04L 9/00    (2006.01)

(52) U.S. Cl. .......................................... 380/40; 380/201

(58) Field of Classification Search ............... 380/40, 380/201, 287; 700/94
See application file for complete search history.

(56) References Cited

U.S. PATENT DOCUMENTS

| | | | | |
|---|---|---|---|---|
| 4,724,425 A * | 2/1988 | Gerhart et al. | ............. | 340/539.1 |
| 5,574,787 A * | 11/1996 | Ryan | ............. | 380/201 |
| 5,809,139 A * | 9/1998 | Girod et al. | ............. | 380/202 |
| 6,141,565 A * | 10/2000 | Feuerstein et al. | ............. | 455/560 |
| 6,195,766 B1 * | 2/2001 | Maxwell et al. | ............. | 714/38 |
| 6,268,889 B1 * | 7/2001 | Koori | ............. | 348/642 |
| 6,725,032 B1 * | 4/2004 | Sheridan et al. | ............. | 455/419 |
| 6,801,777 B2 * | 10/2004 | Rusch | ............. | 455/452.2 |
| 6,810,388 B1 * | 10/2004 | Sato | ............. | 705/57 |
| 6,876,815 B1 * | 4/2005 | McGrath | ............. | 386/109 |
| 7,123,718 B1 * | 10/2006 | Moskowitz et al. | ............. | 380/205 |
| 2002/0071556 A1 * | 6/2002 | Moskowitz et al. | ............. | 380/210 |
| 2002/0141582 A1 | 10/2002 | Kocher et al. | | |
| 2003/0156649 A1 | 8/2003 | Abrams, Jr. | | |
| 2004/0024588 A1 * | 2/2004 | Watson et al. | ............. | 704/200.1 |
| 2004/0054689 A1 | 3/2004 | Salmonsen et al. | | |
| 2004/0059929 A1 | 3/2004 | Rodgers et al. | | |
| 2004/0133794 A1 | 7/2004 | Kocher et al. | | |
| 2004/0161032 A1 | 8/2004 | Morad et al. | | |
| 2004/0260416 A1 | 12/2004 | Kellom et al. | | |
| 2005/0123283 A1 | 6/2005 | Li | | |

* cited by examiner

*Primary Examiner* — Nasser Moazzami
*Assistant Examiner* — Ghazal Shehni
(74) *Attorney, Agent, or Firm* — Toler Law Group

(57) ABSTRACT

A system and method for processing a digital audio signal is disclosed. The system includes an input to receive a digital audio signal and a first output to provide a first digital output signal. The digital audio signal has a first fidelity characteristic and the first digital output signal has a second fidelity characteristic. The second fidelity characteristic is determined in response to security information extracted from the digital audio signal. The first digital output signal is provided to a digital to analog converter.

26 Claims, 4 Drawing Sheets

DIGITAL SECURITY SYSTEM

FIELD OF THE DISCLOSURE

The present disclosure is related to digital security systems and methods.

BACKGROUND

In recent years, it has become increasingly easy to copy and transfer audio files. Accordingly, there are greater risks of unauthorized copying of these files. For example, audio files recorded on a compact disc (CD) or digital versatile disc (DVD), or stored as a Motion Picture Experts Group Audio Layer 3 (MP3) file, may be copied to a computer and transferred over the Internet. This allows Internet users to have access to thousands of unauthorized copies of music.

In an effort to reduce the incidence of unauthorized copying, some audio content producers provide audio files having embedded security information. This security information may serve as an indicator that the associated audio file is not authorized to be copied. The security information can serve as a notification to a computer system that the associated audio file should not be copied, or should not be copied in its original form. There is a need for audio processing systems that adapts to the embedded security information when properly processing the audio files.

DESCRIPTION OF THE DRAWINGS

A system and method for processing a digital audio signal is disclosed. The system includes an input to receive a digital audio signal and a first output to provide a first digital output signal. The digital audio signal has a first fidelity characteristic and the first digital output signal has a second fidelity characteristic. The second fidelity characteristic is determined in response to security information extracted from the digital audio signal. The first digital output signal is provided to a digital to analog converter.

The method includes receiving a digital audio input signal and extracting first security information at a first time from the digital audio input signal. The method also includes setting a fidelity characteristic of a digital output signal to a first level based on the extracted first security information and providing the digital output signal to a digital to analog converter.

Figure 1:
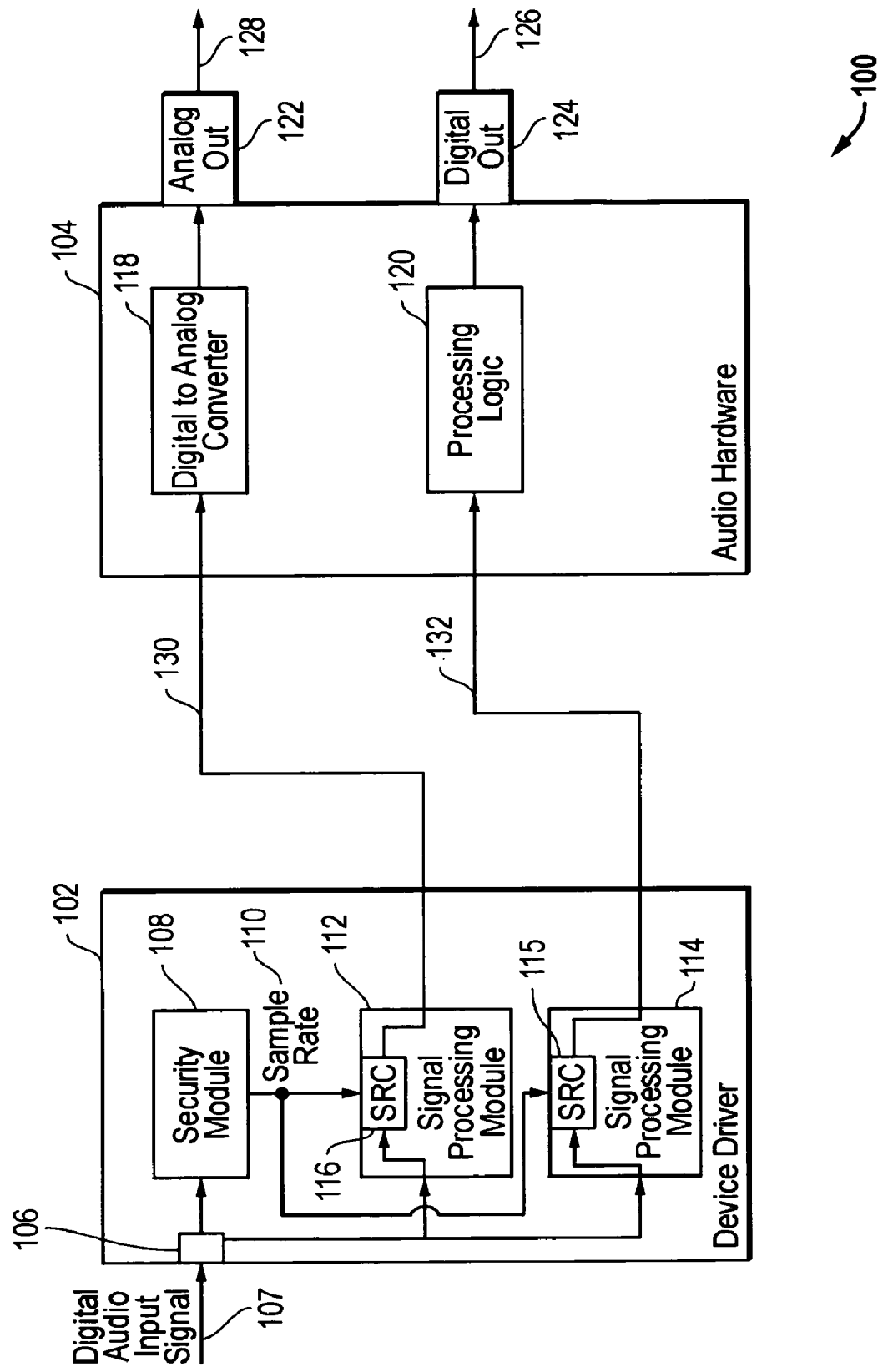
FIG. 1 is block diagram of a particular illustrative embodiment of system for setting a fidelity characteristic of a digital audio signal.

Referring to FIG. 1, a system 100 for processing digital audio signals is illustrated. The system 100 includes a device driver 102 and an audio hardware device 104. In a particular embodiment, the audio hardware device may be a sound card. The device driver 102 includes a security module 108, a first signal processing module 112, and a second signal processing module 114. The first signal processing module 112 includes a sample rate converter 116 and the second signal processing module 114 includes a sample rate converter 115. The audio hardware device 104 includes a digital to analog converter 118 and processing logic 120. The audio hardware device 104 also includes an analog output 122 and a digital output 124.

The device driver 102 includes a digital audio input 106 to receive digital audio signals to be processed. The security module 108, the first signal processing module 112, and the second signal processing module 114 are each responsive to the digital audio input 106. The signal processing module 112 provides a first digital output 130 to the audio hardware device 104. Similarly, the second signal processing module 114 provides a second digital output 132 to the audio hardware device 104. The first digital output 130 is sample rate converted by the sample rate converter 116 and may have a different sample rate than the second digital output 132.

The digital to analog converter 118 in the audio hardware device 104 is responsive to the digital output signal 130. The processing logic 120 in the audio hardware device 104 is responsive to the second output signal 132. The analog output 122 of the audio hardware device 104 is responsive to the output of the digital to analog converter 118 and provides an analog output signal 128. The analog output signal 128 may be provided to an analog output device, such as a speaker or headphones. The digital output 124 of the audio hardware device 104 is responsive to the output of the processing logic 120 and provides a digital output signal 126. The digital output signal 126 may be provided to a digital output device, such as a digital recorder.

During operation, the security module 108 in the device driver 102 receives a digital audio input signal 107 from the digital audio input 106 and detects the presence of security information in the digital audio input signal 107. The security information may be detected in a variety of ways. For example, the digital audio input signal 107 may be based on an audio file, such as an MP3 file, and may contain security information in a file header or other portion of the MP3 file. The file header may be provided as part of the digital audio input signal 107, and the security module 108 may analyze the file header to determine if security information is present. In a particular embodiment, the security information may be transmitted to the security module 108 as part of a signal separate from the digital audio input signal 107.

The security module 108 may extract the security information from the digital audio input signal 107 and compare the extracted information to a stored set of security profiles to determine the security type or level associated with the digital audio input signal 107. Based on the extracted security information, the device driver 102 may adjust the sampling rate of the output signals 130 and 132.

For example, the digital audio input signal 107 may include digital rights management (DRM) information. This DRM information may be designed to limit the fidelity of any audio output based on the digital audio input signal 107. Because the fidelity of the audio output may be based, in part, on the sample rate of the output signal, the fidelity of the audio output may be limited by limiting the sample rate of the output signals 130 and 132. For example, the sample rate of the output signal 132 may be limited to 48 kilohertz by the signal processing module 114, thereby limiting the fidelity of the resulting digital output 126 at the audio hardware device 104.

The digital audio input signal 107 has a first sample rate. This first sample rate may be different than the rate desired to limit the fidelity of an output based on the signal. Accordingly, the sample rate of the first digital output signal 130 may be adjusted to a second sample rate, to limit the fidelity of the analog output 128. Further, the sample rate of the second digital output signal 132 may set to a third sample rate by the sample rate converter 115 of the signal processing module 114 to limit the fidelity of the digital output 126. The fidelity of the digital output 126 and the analog output 128 of the audio hardware device 104 may be limited by different amounts, depending on the security scheme being implemented.

To limit the fidelity of the digital output 126 and the analog output 128, the security module 108 may set the sample rate for the output of the sample rate converter 116 according to the detected security information in the digital audio input signal 107 received at the digital audio input 106. The security module 108 may provide the sample rate adjustment instruction through the sample rate control signal 110. The signal processing module 112 converts the sample rate of the digital audio input 106 based on the sample rate control signal 110 using the sample rate converter 116. The sample rate control signal 110, as set by the security module 108, thereby sets the sample rate of the first digital output signal 130. The sample rate of the digital output signal 130 may be set to limit the fidelity of the derived analog output 128 at the audio hardware device 104.

The fidelity of the analog output signal 128 and the digital output signal 126 may be limited by setting other fidelity characteristics of the digital output signals 130 and 132. For example, the fidelity of the analog output signal 128 may be limited by setting a fidelity characteristic of the digital output signals 130 and 132 based on the desired fidelity at the outputs 122 and 124. The signal processing modules 112 and 114 may set different fidelity characteristics of the digital output signals 130 and 132. For example, the signal processing module 112 may set the sample rate of the digital output signal 130, thereby limiting the fidelity of the analog output signal 128.

In another particular embodiment, the signal processing module 112 may limit the bit depth of the digital output signal 130 to limit the fidelity of the analog output signal 128. In yet another particular embodiment, the signal processing module 112 may limit the signal to noise ratio of the digital output signal 130. The signal to noise ratio may be limited by introducing noise into the digital output signal 130. In a particular embodiment, the noise that is introduced is white noise.

In still another particular embodiment, the signal processing module 112 may introduce distortion into the digital output signal 130. This distortion limits the fidelity of the analog output signal 128. In addition, the signal processing module 112 may limit more than one fidelity characteristic of the digital output signal 130 in order to limit the fidelity of the analog output signal to a desired level. For example, the signal processing module 112 may limit both the sampling rate and the bit depth of the digital output signal 130.

The signal processing module 114 may limit a fidelity characteristic of the digital output signal 132 using the same technique, or a different technique, as used by the signal processing module 112. Further, the signal processing module 114 may limit the fidelity characteristic of the digital output signal 132 such that the fidelity of the analog output signal 126 and 128 are limited to different levels.

Limiting the fidelity of the analog output 128 may be important due to improvements in analog recording technology. These improvements have made it possible to make high-fidelity recordings from analog sources. By limiting the fidelity of the analog output signal 128, it becomes more difficult to make high fidelity copies from the analog output.

In addition, the signal processing module 114 may perform processing operations, such as filtering and sample rate conversion operations on the digital audio input signal 107. The sample rate converter 115 of the signal processing module 114 may adjust the sample rate of the digital audio input signal 107 to limit the fidelity of the second digital output 132 provided to the audio hardware device 104. The second digital output 132 therefore may be a filtered and processed output based on the digital audio input signal 107.

Further, the digital to analog converter 118 in the audio hardware device 104 receives the first digital output signal 130. The digital to analog converter 118 converts the first digital output signal 130 to an analog signal 128 provided at the analog output 122. In a particular embodiment, the analog output signal 128 is provided to a speaker. In another particular embodiment, the analog output signal 128 is provided to a set of headphones. Because a fidelity characteristic of the first digital output signal 130 has been set according to the security information detected in response to the digital audio input signal 107, the fidelity of the resulting converted analog output signal 128 can be limited based on the embedded security information.

Moreover, the digital processing logic 120 processes the second digital output signal 132. The sample rate of the second digital output signal 132 may be set by the signal processing module 114. The sample rate of the second digital output signal 132 may be set to a rate different from the sample rate of the first digital output signal 130. This allows the illustrated system to implement different security schemes for different outputs. For example, as illustrated the analog signal 128 is based on the first digital output signal 130. The digital signal 126 is based on the second digital output signal 132. If a particular security scheme calls for different fidelity limits on analog output and digital outputs, the sample rates of the first digital output signal 130 and the second digital output signal 132 may be individually adjusted for the desired fidelity limits.

The second digital output signal 132 is provided to processing logic 120. The processing logic 120 may perform filtering, additional sample rate conversion, or other operations. The digital output 124 is responsive to the output of the processing logic 120 to provide the digital output signal 126. In a particular embodiment, the digital output signal 126 is a Sony/Philips Digital Interface (SPDIF) output.

Figure 2:
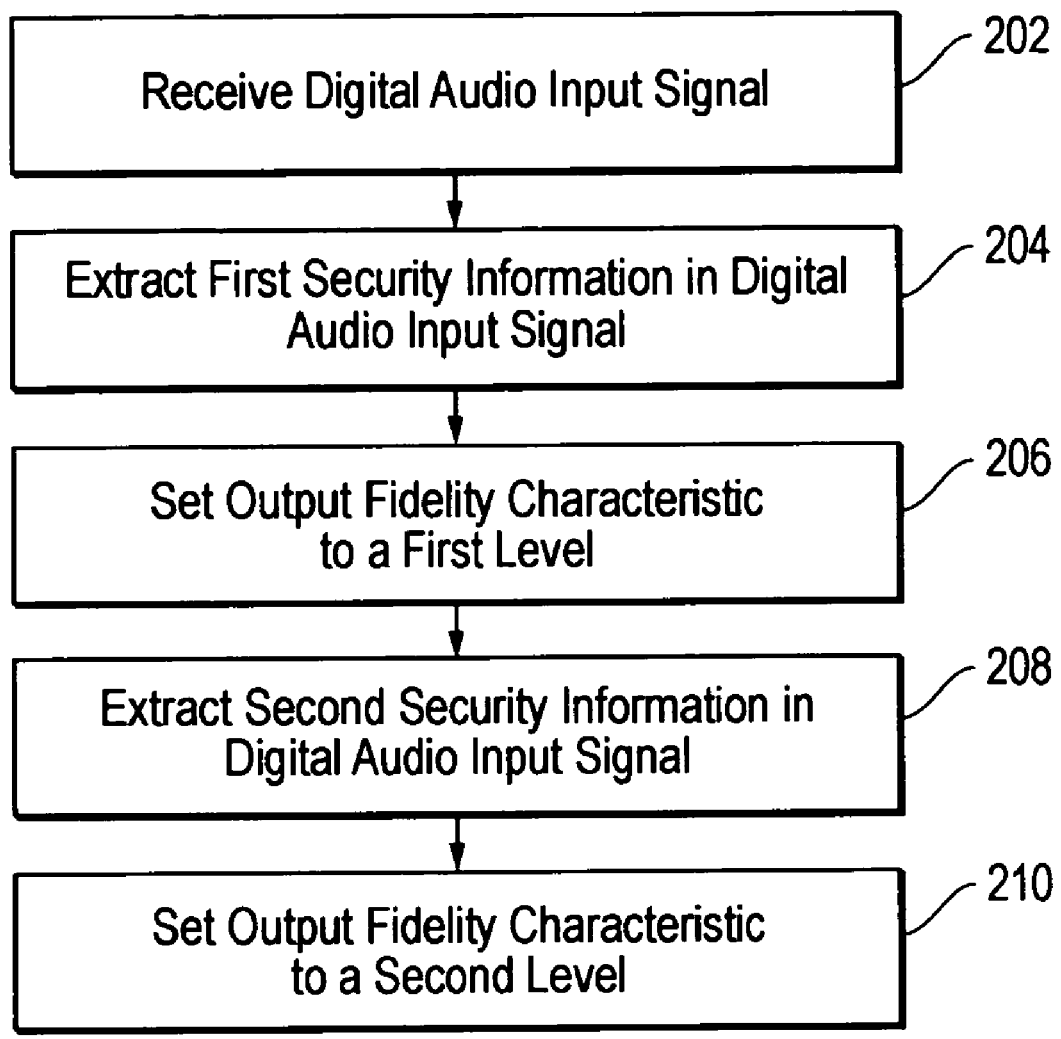
FIG. 2 is flow chart of an illustrative embodiment of a method of setting a fidelity characteristic of a digital audio signal.

Referring to FIG. 2, a method of setting a sample rate for a digital audio input signal is illustrated. At step 202, a digital audio input signal, such as the digital audio input signal 107 of FIG. 1, is received. The digital audio input signal may be based on an audio file, such as an MP3 file, or other audio input source. At step 204, first security information is extracted from the digital audio input signal. The information extracted may include digital rights management security information or other security information. The security information may indicate or correspond to a fidelity characteristic for the digital audio input signal. Setting the fidelity characteristic in response to the security information ensures the audible output based on a resulting audio signal derived from the digital audio input 106 is fidelity limited. This can be helpful to discourage unauthorized copying of the digital audio source. The fidelity characteristic may be a sample rate, a bit depth, a signal to noise ratio, a distortion level, or other appropriate characteristic.

At step 206, the fidelity characteristic for the digital audio input signal is set to a first level. This first rate may be determined by or otherwise associated with the security information extracted from the digital audio input signal. The first level may be set to limit the fidelity of an audio output based on the digital audio input signal. In a particular embodiment, an analog output signal based on the sample rate converted digital output signal has a signal to noise ratio of less than about 96 dB. This signal to noise ratio may render the analog signal unattractive for unauthorized copying. The fidelity characteristic may be a sample rate that is set by a sample rate converter, such as the sample rate converter 116 of FIG. 1. The sample rate converter may be part of a device driver, such as the device driver 102. The fidelity characteristic may be set based on a sample rate adjustment signal or instruction received from a security module, such as the security module 108.

At step 208, second security information is extracted from the digital audio input signal. The second security information may be extracted by the security module 108. The second security information may be different from the first security information. For example, the second security information may indicate a higher or lower level of security for the digital audio signal, or may indicate a different security scheme. Proceeding to step 210, the output fidelity characteristic for the digital audio input is set to a second level. The second level may be a sample rate level that is set by the sample rate converter 116 based on a sample rate adjustment instruction or signal received from the security module 108. This second sample rate may be different from the first sample rate. Thus, the fidelity characteristic of a processed digital audio signal may be changed dynamically based on detected security information in the digital audio input signal. This allows more flexibility in processing of security information and allows for the setting of different security standards for different types of digital audio input signals. For example, if the digital audio input signal is based on an open source audio file or other audio source intended for wide distribution, the security information associated with the digital audio input signal may allow for a high fidelity audio output. If, however, the digital audio input signal is based on a source that is highly restricted, the fidelity of the digital audio output may be significantly limited.

Figure 3:
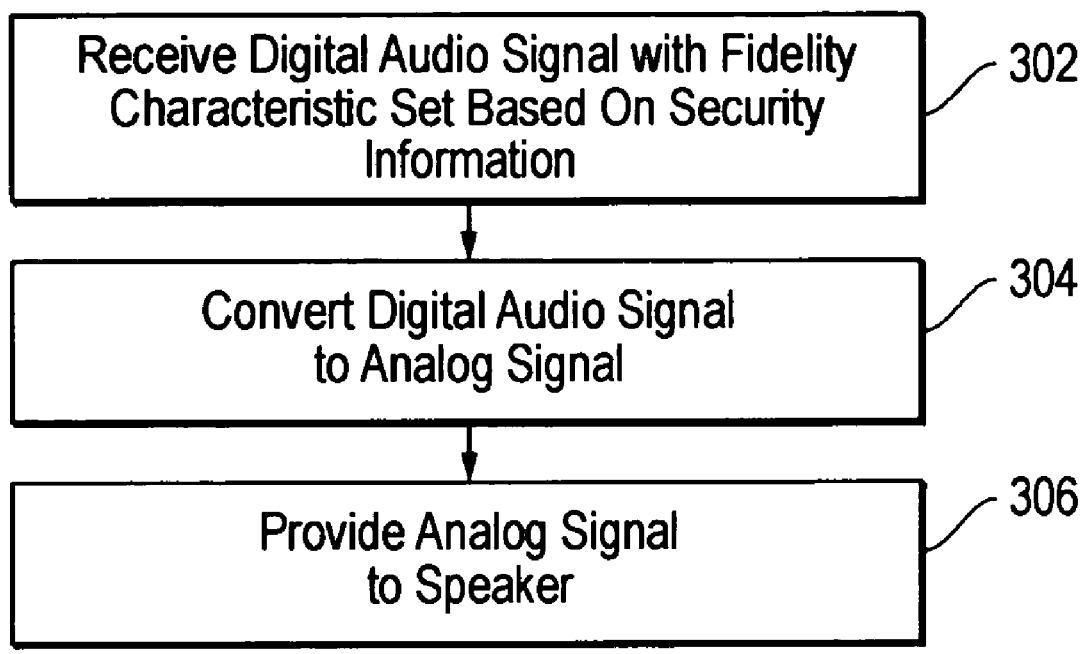
FIG. 3 is flow chart of an illustrative embodiment of a method of converting a digital audio signal to an analog output.

Referring to FIG. 3, a method for converting a digital audio signal to an analog output signal is illustrated. At step 302, a digital audio signal is received. The digital audio signal has a fidelity characteristic that has been modified based on security information. For example, the first digital output signal 130 may provide the digital audio signal. In a particular embodiment, the fidelity characteristic has been set to limit the fidelity of an audio output derived from the received digital audio signal. Proceeding to step 304, the digital audio signal is converted to an analog signal such as by a digital to analog converter. At step 306 the analog signal is provided to a speaker. The fidelity of the analog signal is limited based on the fidelity characteristic set for the digital audio signal. By limiting the fidelity of the resulting analog signal, the signal may be a less attractive source for unauthorized copying.

Figure 4:
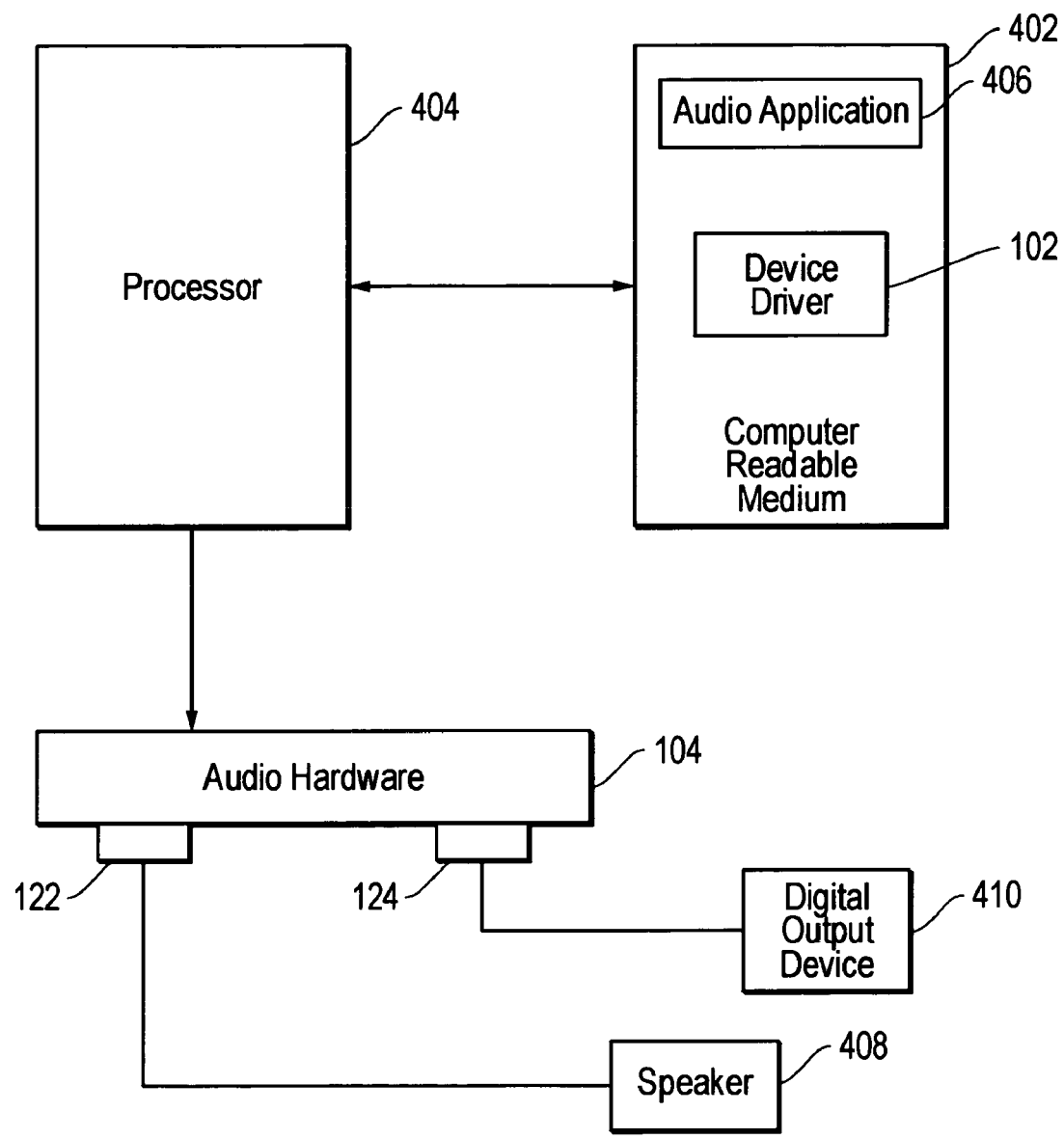
FIG. 4 is a block diagram of a particular embodiment of a computer audio system capable of implementing the methods of FIG. 2 and FIG. 3.

Referring to FIG. 4, a particular embodiment of a computer audio system is illustrated. The system includes a computer readable medium 402, a processor 404, a audio hardware device 104, a speaker 408, and a digital output device 410. The computer readable medium 402 stores a computer application 406 and the device driver 102. The audio hardware device includes an analog output 122 and a digital output 124.

The computer readable medium 402 is accessible to the processor 404. The computer readable medium 402 may be a Random Access Memory (RAM) module, a hard disk, flash memory, or other computer readable medium. In addition, the audio hardware device 104 is responsive to the processor 404. Further, the speaker 408 and the digital output device 410 are responsive to the analog output 122 and the digital output 124 of the audio hardware device, respectively.

During operation, the audio application 406 is executed by the processor 404 to perform various audio functions. The audio application 406 may comprise a series of instructions for the processor 404 to perform these functions. The audio application 406 may be a music application, a game application, or other application with audio features.

To output the audio features of the audio application 406, the processor 404 may access the device driver 102. The device driver 102 may comprise a series of instructions to control the processor 404 and the audio hardware device 104. In a particular embodiment, the device driver 102 may include instructions to extract first security information at a first time from a digital audio input signal generated by the audio application 406. This security information may be provided by the audio application 406 to indicate that the digital audio input signal is protected from copying. The security information may also indicate that any audio output derived from the digital audio input signal should be fidelity limited, in order to discourage copying of the audio output.

Further, the device driver 102 may include instructions to set a fidelity characteristic, such as a sample rate, bit depth, signal to noise ratio, or distortion level, or other appropriate characteristic of a digital output signal provided to the audio hardware device 104 via the processor 404 to a first rate based on the extracted first security information. The fidelity characteristic may be set so that an audio output based on the digital output signal will be fidelity limited. For example, the sample rate of the digital output signal may be limited to less than or equal to about 48 kilohertz.

In addition, the device driver 102 may include instructions to provide the digital output signal at an output of the audio hardware device 104. The digital output signal may be converted to an analog signal, and provided to the speaker 408 via the analog output 122. The analog signal is based on the fidelity characteristic limited digital output signal, and may therefore be a fidelity limited signal. Accordingly, the output of the speaker 408 may be fidelity limited, thereby discouraging copying of the output.

In another particular embodiment, the device driver 102 may include instructions to extract second security information at a second time from the digital audio input signal. This second security information may be different from the first security information. For example, the second security information may indicate that the digital audio input signal at the second time is under a higher security protocol and that any audio output based on the digital audio input signal should be fidelity limited. Further, the device driver 102 may include instructions to set a fidelity characteristic of the digital output signal to a second level based on the extracted second security information. This second level may be selected to limit the fidelity of an audio output based on the digital audio input signal. Thus, the fidelity characteristic of a processed digital audio signal may be changed dynamically based on detected security information in the digital audio input signal. This allows more flexibility in processing of security information and allows for the setting of different security standards for different types of digital audio input signals.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
   a signal processor comprising:
      an input to receive a digital audio signal, the digital audio signal having a first fidelity characteristic; and
      a first output to provide a first digital output signal having a second fidelity characteristic, wherein the second fidelity characteristic is determined in response to security information extracted from the digital audio signal;
   wherein the security information extracted from the digital audio signal is compared to a security profile to determine a level of security associated with the digital audio signal; and
   wherein the first digital output signal is provided to a digital to analog converter.

2. The system of claim 1, wherein the digital audio signal includes a third fidelity characteristic, wherein the first digital output signal includes a fourth fidelity characteristic, and wherein the fourth fidelity characteristic is determined in response to the security information extracted from the digital audio signal.

3. The system of claim 1, further comprising:
   a security module to extract the security information from the digital audio signal.

4. The system of claim 1, further comprising:
   a first signal processing module to set the second fidelity characteristic.

5. The system of claim 1, wherein the first fidelity characteristic is a first sample rate and the second fidelity characteristic is a second reduced sample rate.

6. The system of claim 1, wherein the second fidelity characteristic is a sample rate that is less than or equal to about 48 kilohertz.

7. The system of claim 1, wherein the first fidelity characteristic is a first bit depth and the second fidelity characteristic is a second reduced bit depth.

8. The system of claim 1, wherein the first fidelity characteristic is a first signal to noise ratio and the second fidelity characteristic is a second reduced signal to noise ratio.

9. The system of claim 1, wherein the first fidelity characteristic is a first distortion level and the second fidelity characteristic is a second increased distortion level.

10. The system of claim 1, further comprising:
    a second output to provide a second digital output signal having a third fidelity characteristic.

11. The system of claim 1, wherein the security information extracted from the digital audio signal includes digital rights management information.

12. A system comprising:
    a digital to analog converter to receive a first digital signal, wherein a fidelity characteristic of the first digital signal is based on security information associated with a digital audio source of the first digital signal; and
    a comparator to compare the security information to a security profile to determine a level of security associated with the first digital signal;
    wherein the digital to analog converter converts the first digital signal to an analog output.

13. The system of claim 12, further comprising:
    processing logic to receive a second digital signal, wherein a fidelity characteristic of the second digital signal is based on the level of security associated with the digital audio source.

14. The system of claim 12, wherein the fidelity characteristic of the first digital signal is one of a sample rate, a bit depth, a signal to noise ratio, and a distortion level.

15. A method, comprising:
    receiving a digital audio input signal at a digital signal processor;
    extracting, at the digital signal processor, first security information at a first time from the digital audio input signal;
    comparing the extracted first security information to a security profile to determine a level of security associated with the digital audio input signal;
    setting a fidelity characteristic of a digital output signal to a first level based on the level of security associated with the digital audio input signal; and
    providing the digital output signal to a digital to analog converter.

16. The method of claim 15, further comprising:
    extracting second security information at a second time from the digital audio input signal; and
    setting a second fidelity characteristic of the digital output signal to a second level based on the extracted second security information.

17. The method of claim 15, wherein the fidelity characteristic is a sample rate.

18. The method of claim 17, wherein the sample rate is about 48 kilohertz.

19. The method of claim 15, wherein the first security information is associated with a digital rights management protocol.

20. The method of claim 15, wherein an analog output based on the digital output signal has a signal to noise ratio of less than about 96 decibels (dB).

21. A method, comprising:
    receiving, at a digital signal processor, a digital audio signal, wherein a fidelity characteristic of the digital audio signal is modified based on security information extracted from the digital audio signal;
    comparing the security information extracted from the digital audio signal to a security profile to determine a level of security associated with the digital audio signal; and
    converting the digital audio signal to an analog output signal.

22. The method of claim 21, wherein the fidelity characteristic of the digital audio signal is one of a sample rate, a bit depth, a signal to noise ratio, and a distortion level.

23. The method of claim 21, further comprising:
    providing the analog output signal to a speaker.

24. The method of claim 21, wherein the security information is associated with a digital rights management protocol.

25. A non-transitory computer readable storage medium having a computer program embedded within the non-transitory computer readable medium storage, the computer program comprising:
    instructions to extract first security information at a first time from a digital audio input signal;
    instructions to compare the extracted first security information to a security profile to determine a level of security associated with the digital audio input signal:
    instructions to set a fidelity characteristic of a digital output signal to a first level based on the level of security associated with the digital audio input signal; and
    instructions to provide the digital output signal at an output.

26. The non-transitory computer readable storage medium of claim 25, further comprising:
    instructions to extract second security information at a second time from the digital audio input signal; and
    instructions to set a second fidelity characteristic of the digital output signal to a second level based on the extracted second security information.

* * * * *